United States Patent
Van Hout

[11] Patent Number: 6,056,530
[45] Date of Patent: May 2, 2000

[54] DEVICE FOR MANUFACTURING INFORMATION CARRIERS BY INJECTION MOULDING

[75] Inventor: Petrus Johannes Frederik Joseph Van Hout, Helmond, Netherlands

[73] Assignee: Axxicon Moulds Eindhoven B.V., Son, Netherlands

[21] Appl. No.: 09/066,491

[22] Filed: Apr. 24, 1998

[30] Foreign Application Priority Data

Apr. 29, 1997 [NL] Netherlands ............................ 1005937

[51] Int. Cl.⁷ ........................... B29C 33/30; B29C 33/16; B29C 33/18; B29C 33/34
[52] U.S. Cl. ........................... 425/150; 425/186; 425/190; 425/192 R
[58] Field of Search .................................... 425/150, 182, 425/185, 186, 190, 192 R

[56] References Cited

U.S. PATENT DOCUMENTS

| | | |
|---|---|---|
| 5,516,276 | 5/1996 | Takayama et al. . |
| 5,612,062 | 3/1997 | Takahashi ........................... 425/192 R |
| 5,626,885 | 5/1997 | Vromons ................................ 425/110 |

FOREIGN PATENT DOCUMENTS

| | | |
|---|---|---|
| 62-286717 | 12/1987 | Japan ..................................... 425/182 |
| 663929 | 1/1988 | Switzerland . |
| 2287210 | 9/1995 | United Kingdom . |
| 9419166 | 9/1994 | WIPO . |

*Primary Examiner*—David A. Simmons
*Assistant Examiner*—Robert A. Hopkins
*Attorney, Agent, or Firm*—Webb Ziesenheim Logsdon Orkin & Hanson, P.C.

[57] ABSTRACT

An auxiliary device is intended to be added to an injection moulding device for manufacturing disc-like information carriers. The injection moulding device comprises a mould having two mold parts which in a closed situation bound a mould cavity. An insert plate can be position against an end wall of the mould cavity, on which plate is found the information to be recorded onto the information carrier. Received in a supply holder are insert plates which can be transported by a mechanical device from and to the end wall. Positioning of the insert plates by the mechanical device takes place such that each insert plate is brought into a convex state, is placed with its central zone against the end wall and the convex form is then removed for stable positioning of the insert plate in flat state. The desired centering is thus achieved in simple manner, while friction between the insert plate and the wall is essentially prevented.

11 Claims, 9 Drawing Sheets

DEVICE FOR MANUFACTURING INFORMATION CARRIERS BY INJECTION MOULDING

BACKGROUND OF THE INVENTION

For the manufacture of optical information carriers and the like, such as compact discs, VLPs, NODs, recordable discs, use is made of an injection mould with a mould cavity in which the mechanical information to be carried by the information carrier is to be found in negative form. The information component carrying the relevant information can for instance be embodied as a part of the mould, or as an insert plate or so-called "stamper". A stamper is a plate generally embodied in nickel, on the active surface of which the information is pre-arranged by per se known means. The relevant information will generally be of the digital type and consist of an alternation of either elevations or recesses and flat, unprocessed parts. The information is generally recorded on the information carrier in a spiral-shaped track.

After an insert plate has been used for manufacturing a determined number of information carriers the quality of the information carriers manufactured therewith deteriorates and the information component in question must be replaced. The insert plate must thus be replaced when the desired number of information carriers has been manufactured or when it has manufactured the maximum number of information carriers acceptable within a set quality standard.

When an insert plate is re-placed it must be ensured that it is precisely centred on the relevant wall of the mould cavity. If it is found that said centering is not wholly in accordance with the set requirements, the insert plate must be shifted until the prerequisite exact centering is realized. It is an object of the invention to furnish provisions enabling said centering to be performed such that during displacement of the insert plate relative to the mould wall a relatively high frictional force is essentially prevented from occurring between the insert plate and said mould wall. Centering can take place more easily with such provisions, while in addition the danger of damage to mould wall and/or insert plate is prevented.

SUMMARY OF THE INVENTION

With a view thereto the invention provides an auxiliary device intended to be added to an injection moulding device for manufacturing disc-like information carriers, which injection moulding device comprises:
  a mould having at least two mould parts displaceable relative to each other,
  which in a first relative position bound a mould cavity, the form of which corresponds with the form of the information carriers for manufacture, into which mould cavity debouches a feed for heated plastic,
  and which in a second relative position are located at a distance from each other such that the mould cavity is accessible; and
  first holding means for holding in a desired position an insert plate for placing against an end wall of the mould cavity, on which plate is found the information to be recorded onto the information carrier, such that an insert plate remains in position relative to the mould cavity when a formed information carrier is removed;

which auxiliary device comprises:
  a supply holder in which at least one insert plate can be received;
  transporting means for transporting successive insert plates between the supply holder and the mould, which transporting means comprise a head which is adapted to displace successive insert plates in axial direction to and from said end wall, all of which plates are provided with a central continuous hole, and which head comprises centering means for placing an insert plate in correct position relative to the end wall by making use of a continuous central hole in an insert plate;

which head comprises:
  second holding means for engaging an insert plate in the edge zone;
  resiliently compressible pushing means for pushing on the central zone of the insert plate counter to the action of the pushing means,
  such that the insert plate acquires a convex form and the insert plate can contact the end wall first with said central zone; and control means connected or connectable to the injection moulding device which are adapted to:
  control the transporting means;
  release the transporting means only in the second relative position of the mould parts in order to transport an insert plate from or to the mould, and
  to control the first holding means and the second holding means such that said central zone of an insert plate first contacts the end wall, through continuing axial displacement the whole insert plate is eventually pressed against the end wall, the first holding means subsequently exert a great force on the insert plate such that on backward axial displacement of the head the insert plate is held against the end wall by the first holding means.

In order to ensure a very reliable centering while wholly avoiding possible damage to the insert plates, the auxiliary device can advantageously be embodied such that the centering means comprise a for instance blunt pin tapering toward the outside.

The holding means can for instance be of magnetic type or based on suction.

A preferred embodiment has the special feature that pushing means comprise a spring-loaded ring.

This variant preferably has the special feature that the ring is tiltable. Said tiltability is an additional degree of freedom of movement. Should the changing tool not be directed completely parallel to the relevant wall of the mould cavity, for instance due to the speed of movement, the correct positioning and desired pushing of the insert plate against the relevant wall of the mould cavity will then nevertheless be ensured as a consequence of said compression of the preferably plastic ring with (slight) tilting thereof, wherein a correct centering is also ensured.

A preferred embodiment has the special feature that the ring engages only in a zone adjoining the continuous central hole in the insert plate. According to the invention a correct centering of the inner zone hereby takes place first, followed by a pushing in the zones located further to the outside. The final positioning is obtained by removing the convex form of the insert plate and holding thereof with force against the wall of the mould cavity.

A particular embodiment of the latter described variant has the special feature that the radial extent of said engagement zone amounts to a maximum of 3 mm.

BRIEF DESCRIPTION OF THE DRAWINGS

The invention will now be elucidated with reference to the annexed drawings, in which.

DESCRIPTION OF THE PREFERRED EMBODIMENTS

Figure 1:
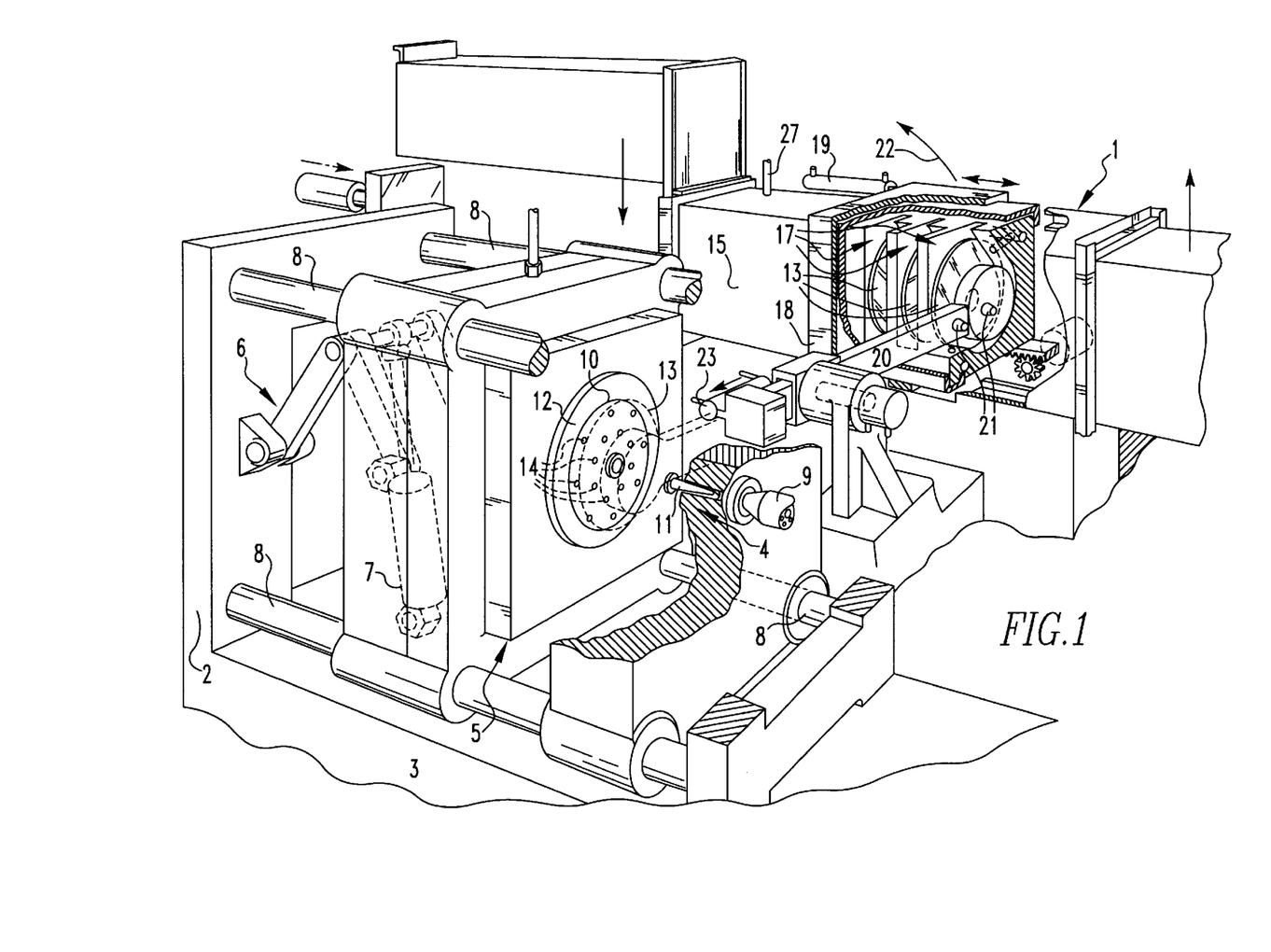
FIG. 1 shows a partly broken away perspective view of an injection mould having an auxiliary device with one head, wherein the supply holder is displaceable linearly.

FIG. 1 shows an auxiliary device 1 which is added to an injection moulding device 2 for manufacturing disc-like information carriers.

The injection moulding device comprises a mould 3 with two mould parts 4, 5 displaceable relative to each other. By means of a lever mechanism 6 and a hydraulic cylinder 7 the mould part 5 can be moved reciprocally, wherein guiding takes place with four guide rods which, for the sake of convenience, are all designated with 8 and which are ordered in a square pattern. The relatively fixed mould part 4 can be coupled to the nozzle 9 of a plasticizing unit.

In a first, closed relative position the mould parts 4 and 5 bound a mould cavity 10, the form of which corresponds with the form of the information carriers to be manufactured. Debouching into mould cavity 10 is a feed 11 for heated plasticized plastic. In a second, open relative position the mould parts 4 and 5 are located at a mutual distance such that mould cavity 10 is accessible and essentially does not exist at that moment. This open position is shown in FIG. 1.

The injection moulding device 2 further comprises positioning means for holding at a desired position an information component, in this case a plate or stamper for placing against an end wall 12 of mould cavity 10, on which the information for recording onto the information carrier is found in negative form, which information component remains in position relative to mould cavity 10 during removal of a formed information carrier. In order to hold a stamper 13 in position use is made in this embodiment of a number of holes 14 in end wall 12 which hold the stamper in position with underpressure.

The auxiliary device 1 comprises a number of supply holders 15 serving as supply holders in which a number of stampers 13 can be received in separate compartments. A transporting device 16 serves to transport successive stampers between supply holder 15 and mould 4, 5.

The individual compartments 17 are made accessible by sliding a cover member 18 by means of a cylinder unit 19.

The transporting device 16 comprises an arm 20, on the one end of which are situated three suction cups 21. Using these suction cups a stamper 13 can be gripped for removal from a compartment 17 and for transport in the direction of the mould 4, 5 by swinging the arm 20 as according to arrow 22. As shown in FIG. 1, the arm 20 cannot pass the guide rods 8. In this respect the arm 20 is retracted in an elevated position thereof by energizing cylinder unit 23, so that with further rotation it can pass the relevant rod 8. After reaching a relevant, in this case horizontal, position, the arm can again be extended to place the stamper 13 against the end wall 12, where by energizing a source of air under underpressure it is sucked fixedly against end wall 12 via holes 14.

It will be apparent that the reverse displacement is also possible.

It is noted that FIG. 1 shows no control means with which the diverse components are functionally adapted to each other in time.

The various compartments 17 can be placed at a desired location, also under control of a central processing unit which includes a control program, such that a stamper 13 taken out of mould 4, 5 can be placed in an empty and, if desired, preselected compartment 17, or a selected compartment 17 can be placed at the relevant removal location for transporting the stamper 13 present in that compartment 17 to the mould 4, 5.

Via a source (not drawn) of air under a small overpressure air under a slight overpressure can be blown via a feed 27 into the supply holder 15. The air is made dust-free beforehand. This provision ensures that the stampers 13 present in supply holder 15 remain stored as dust-free as possible.

Figure 2:
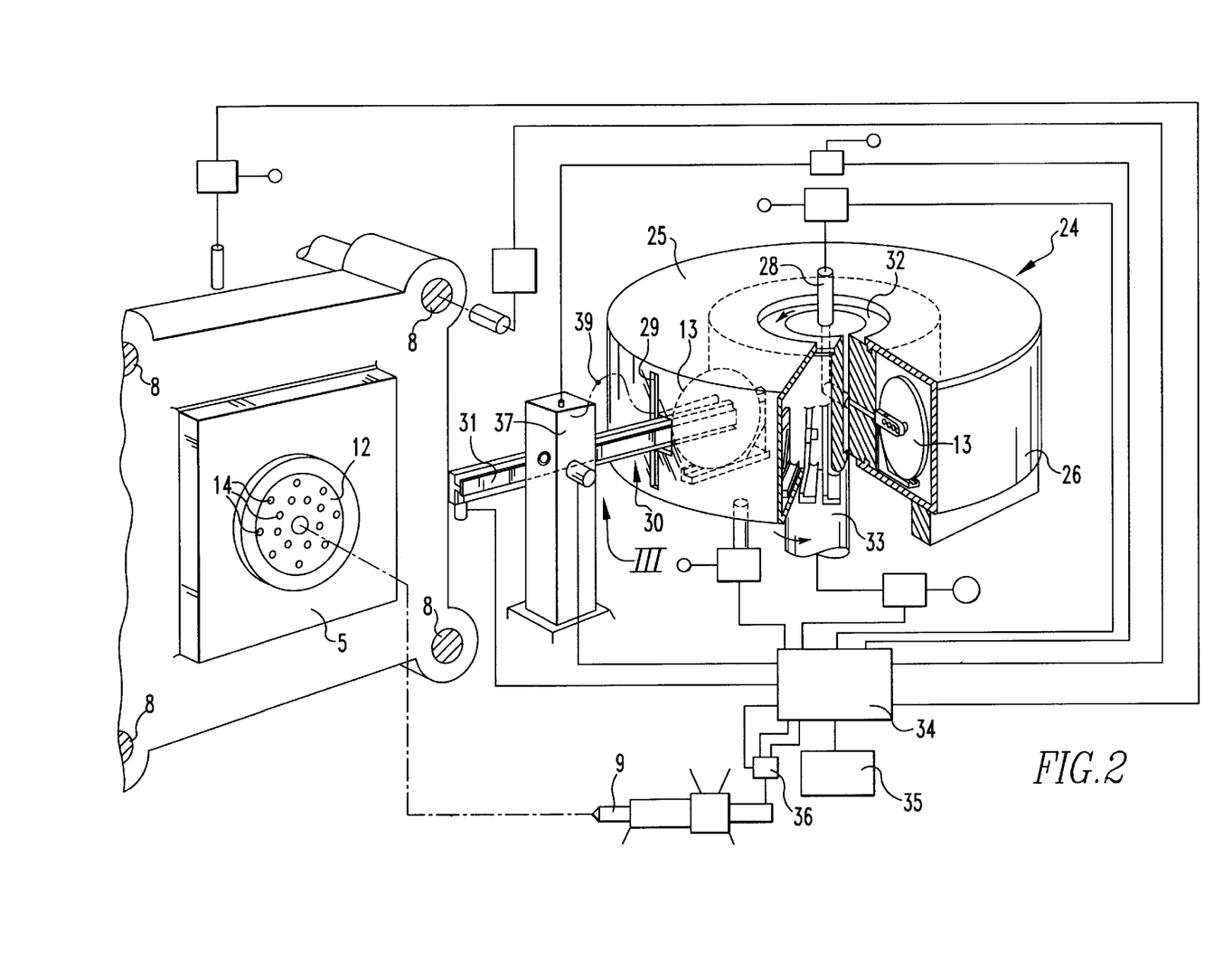
FIG. 2 shows a partly broken away perspective view of an auxiliary device and mould, partially in (block) schematic form, wherein the supply holder is rotatable.

FIG. 2 shows a variant in which the auxiliary device 24 comprises an annular supply holder 25.

The supply holder comprises a stationary housing 26 which via a feed 28 receives dust-free air under a slight overpressure. The interior of supply holder 25 is accessible via a slot-like opening 29 with a central widening 30 through which the stampers 13 can be transported making use of a transporting arm 31. In this respect reference is made to the discussion of FIG. 3 hereinbelow.

A carrier turntable 32 is placed in the stationary supply holder 26. Turntable 32 can be rotated by means of a motor 33, wherein means are present for sensing the angular position of turntable 32 relative to the slot 29, 30 such that a desired location of the turntable corresponds with the position of slotted hole 29, 30. A central processing unit 34 with input 35 controls auxiliary device 24 and synchronizes the diverse, mutually co-acting components. The CPU 34 also receives via a data input 36 data relating to the open or closed position of mould 4, 5.

Figure 3:
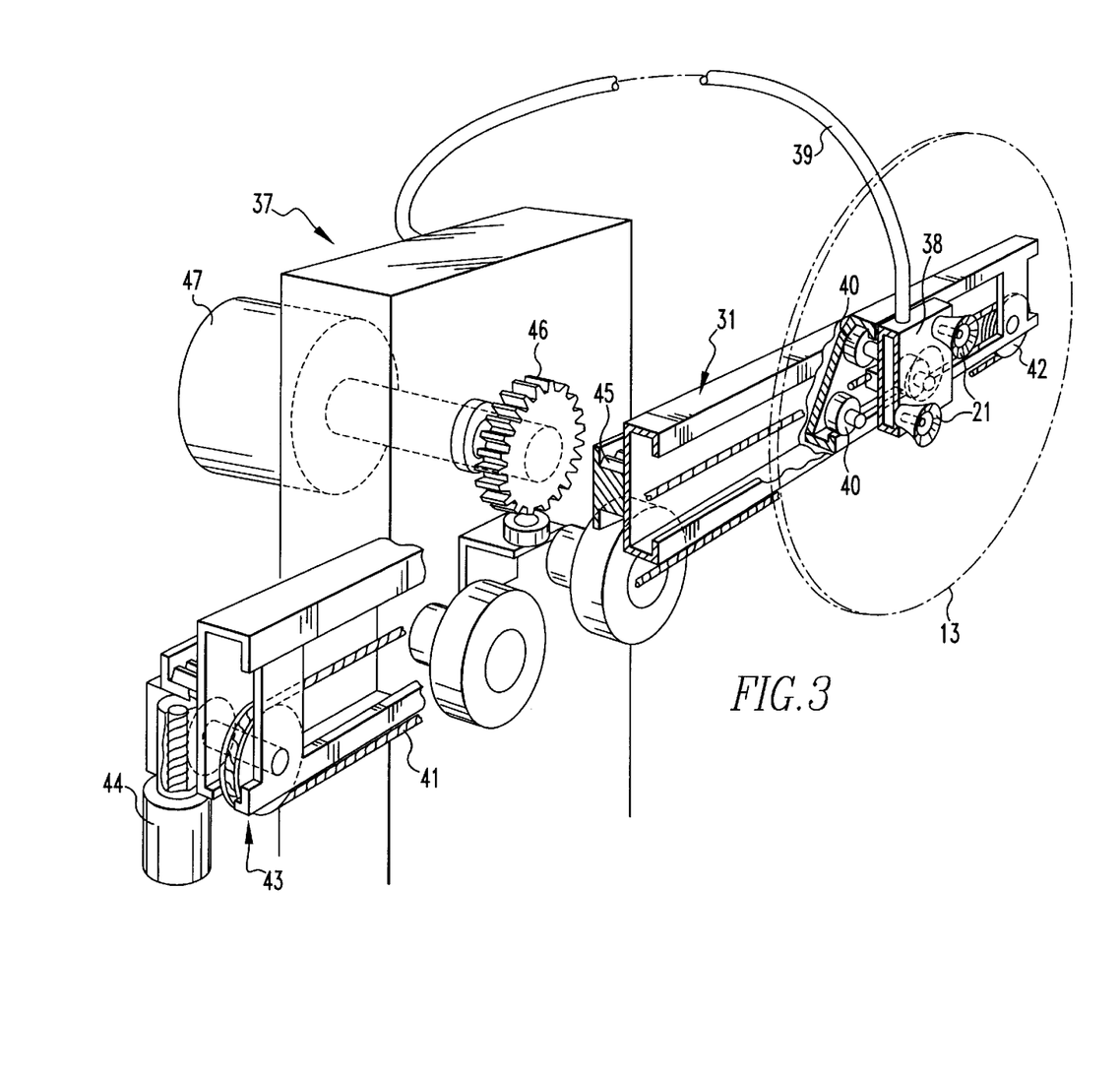
FIG. 3 shows the detail III of FIG. 2 on enlarged scale and in partly broken away perspective view.

FIG. 3 shows the manner in which a stamper 13 can be displaced by means of the transporting device 37 of which the arm 31 forms part.

A carriage 38 can travel along the arm 31. Carriage 38 carries the suction cups 21 as in FIG. 1, which are connected via a suction line 39 to a source of air under underpressure (not drawn). By means of rollers 40 the carriage can be displaced along the arm 31 which is embodied for this purpose as a profile beam open to one side, as shown clearly in FIG. 3. An endless cord 41 is connected to carriage 38 for transport. This cord 41 is trained round a reversing roller 42 and a drive roller 43 which is driven by a motor 44. The carriage 38 can thus travel reciprocally along the arm 31. The arm itself can move reciprocally by means of a rack 45 which is driven by a tooth wheel 46 which is connected in turn to a motor 47.

By suitable control of the motors 44 and 47 and adapted energizing of the underpressure means for controlling the suction cups 21, a stamper can be moved out of supply holder 25 to mould 4, 5 and vice versa.

Figure 4:
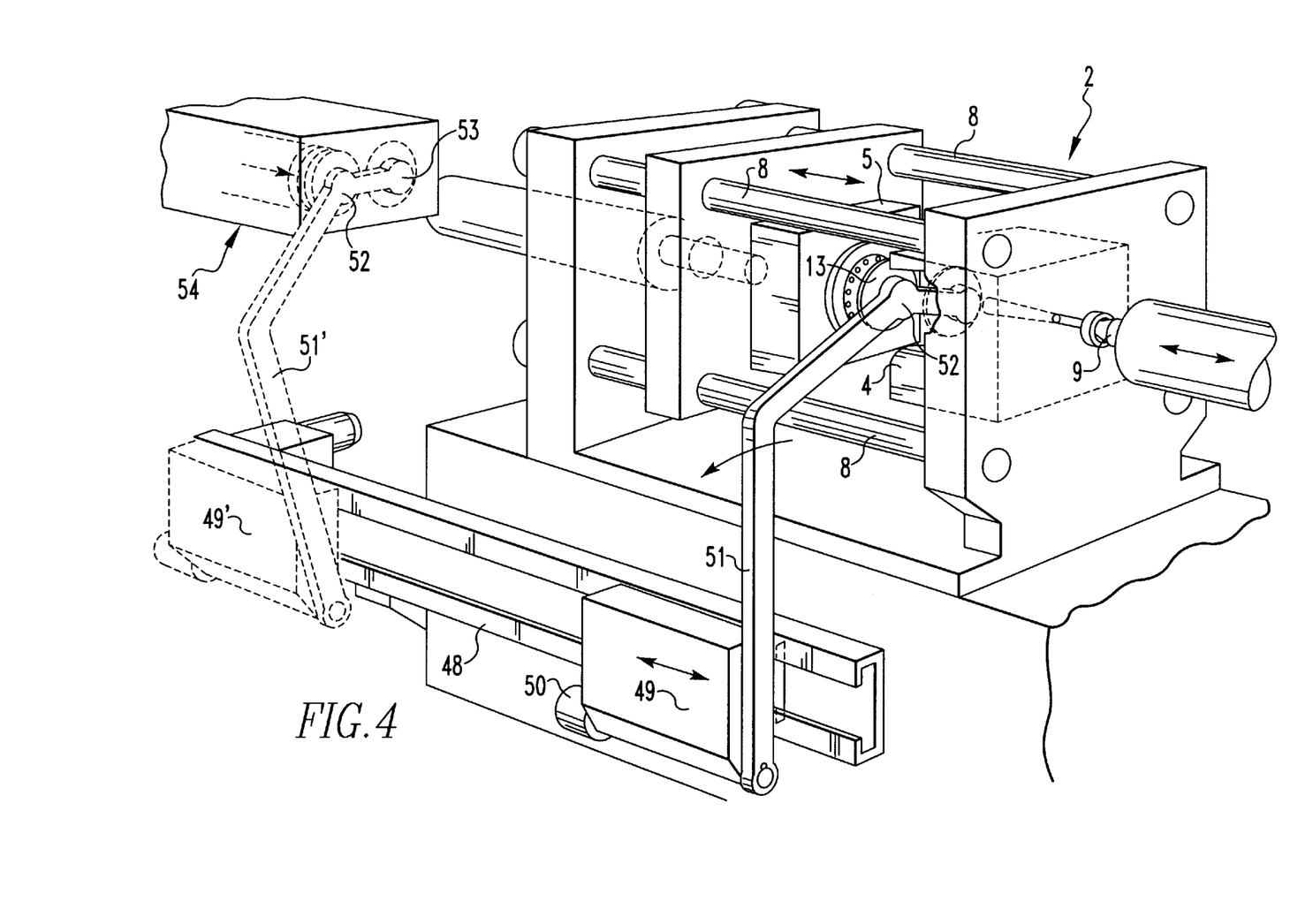
FIG. 4 shows a partly perspective view of a variant.

FIG. 4 shows the injection moulding device 2 to which is added an auxiliary device 48 of another type. In this case a carriage 49 is drivingly displaceable by means of a motor 50 in lengthwise direction relative to the mobility of the mould 4, 5. Carriage 49 bears a bent arm 51 with two active end zones 52, 53 which are each embodied with energizable suction cups. The heads 52, 53 are placed at identical radial positions relative to the pivot axis defined by motor 50. The structure ensures a free mobility of the active end zones 52, 53 including a picked-up stamper, without obstruction herein being encountered due to the presence of the guide rods 8. In this embodiment the carriage 49 can be moved from the position indicated with full lines, which corresponds with the position of the opened mould 4, 5, to the position 49' designated with dashed lines in which stampers 13 can be placed into or removed from a magazine 54.

The use of a double head has the advantage that in one work operation with the removal of a stamper the following stamper can be placed, which can provide a considerable time-saving.

Figure 5:
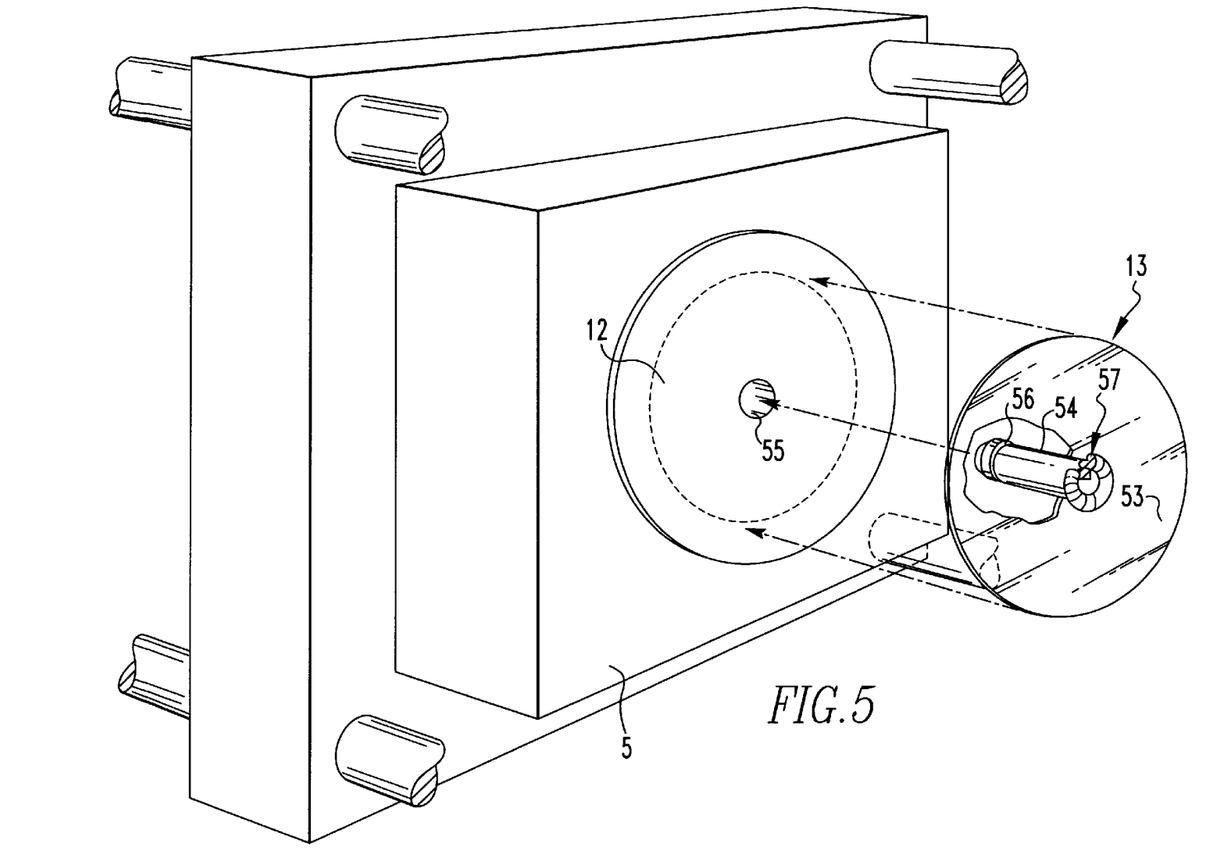
FIG. 5 is a perspective view of a part of an injection mould with mechanical positioning means.

FIG. 5 shows the manner in which a stamper 13 can be held in position against the end wall 12. Use is made in this case of mechanical holding means in the form of a central centering and positioning pin 154 which can be inserted into the central hole of stamper 13 and fits into a positioning hole 55 in end wall 12. A groove 56 serves to hold the positioning pin 154 in the processing position. Pin 154 bears on its end a small widening which has sufficient radial and axial dimensions to firmly secure a stamper, but nevertheless leaves only a minimal mark in the formed end product. In this respect the holding edge 57 is drawn exaggeratedly large in relation to the actual dimensions for the sake of clarity.

Figure 6:
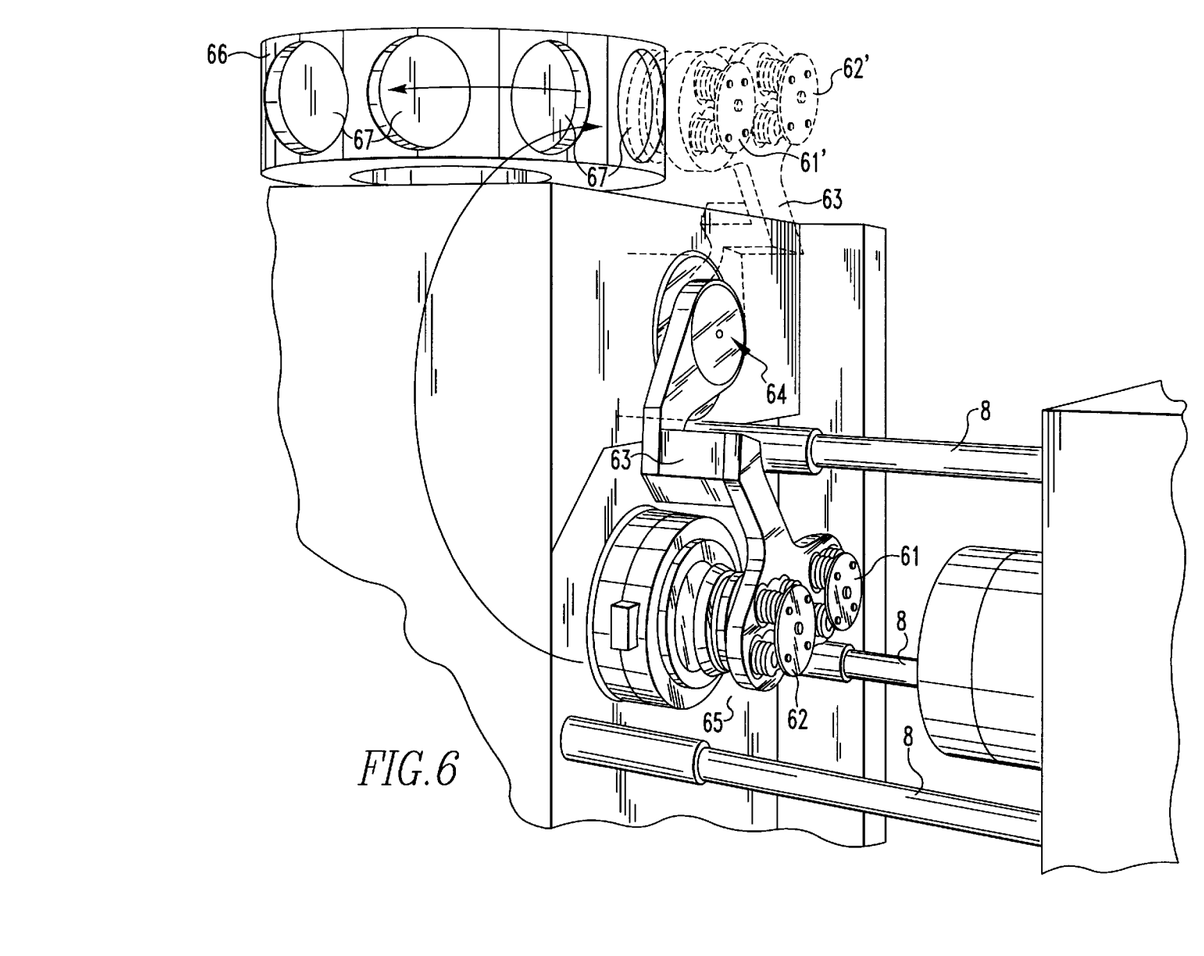
FIG. 6 is a partly perspective view of a detail of a preferred embodiment.

FIG. 6 shows a structure, the principle of which corresponds with that according to FIG. 4. The heads 61 and 62 are carried by an arm 63 which is pivotable under the influence of a drive (not shown). The pivot centre is designated with 64. Shown with broken lines is that the arm can be pivoted with the heads to a position in which the heads are not situated in the region of the mould 65 but in the region of a horizontally rotatable supply holder 66. In this position shown with broken lines the arm is designated with 63' and the heads respectively with 61' and 62'.

In this embodiment the control means can be adapted to control the heads 61, 62 by pivoting arm 63 such that the heads are temporarily halted in their path between supply holder (61', 62') and mould (61, 62) for manual placing and removal of a stamper.

It is noted that supply holder 66 is embodied such that positioning provisions 67 into which insert plates can be taken are situated in largely tangential positions.

Figure 7:
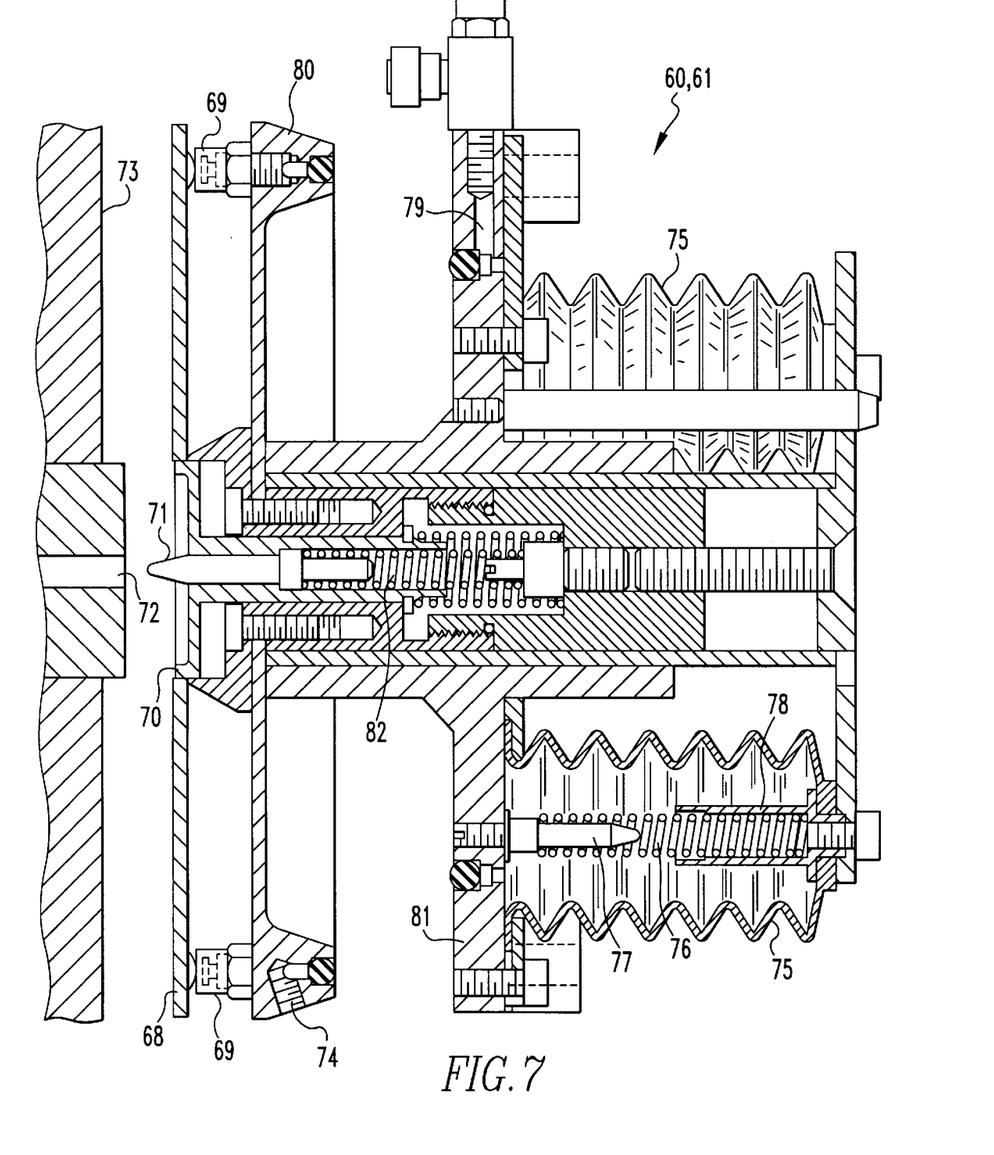
FIG. 7 shows partly in side view and partly in longitudinal section a head as according to FIG. 6.

FIG. 7 shows a head 61 or 62. An insert plate 68 is supported by suction cups 69. insert plate 68 has a central hole 70 through which extends a blunt, tapering centering pin 71 which serves for co-action with hole 72 debouching on mould wall 73.

Suction cups 69 are connected to a controllable source of underpressure via connection 74. Bellows 75 enclose respective pressure springs 76 which co-act with respective centering pins 77 and sleeves 78. Via a controllable source of underpressure, connected via a conduit system designated with 79, the bellows 75 can be subjected to an underpressure whereby an effective shortening occurs which results in a displacement of carrier plate 80 relative to frame 81. A spring system 82 loads centering pin 71 relative to frame 81.

Attention is drawn to the fact that centering means other than those drawn are also possible, for instance sensors having added thereto electronics and suitable control means.

In the FIGS. 8 and 9 discussed hereinbelow the functional elements corresponding for instance with FIG. 7 are designated with the same reference numerals as therein. A description will therefore be omitted here.

Figure 8:
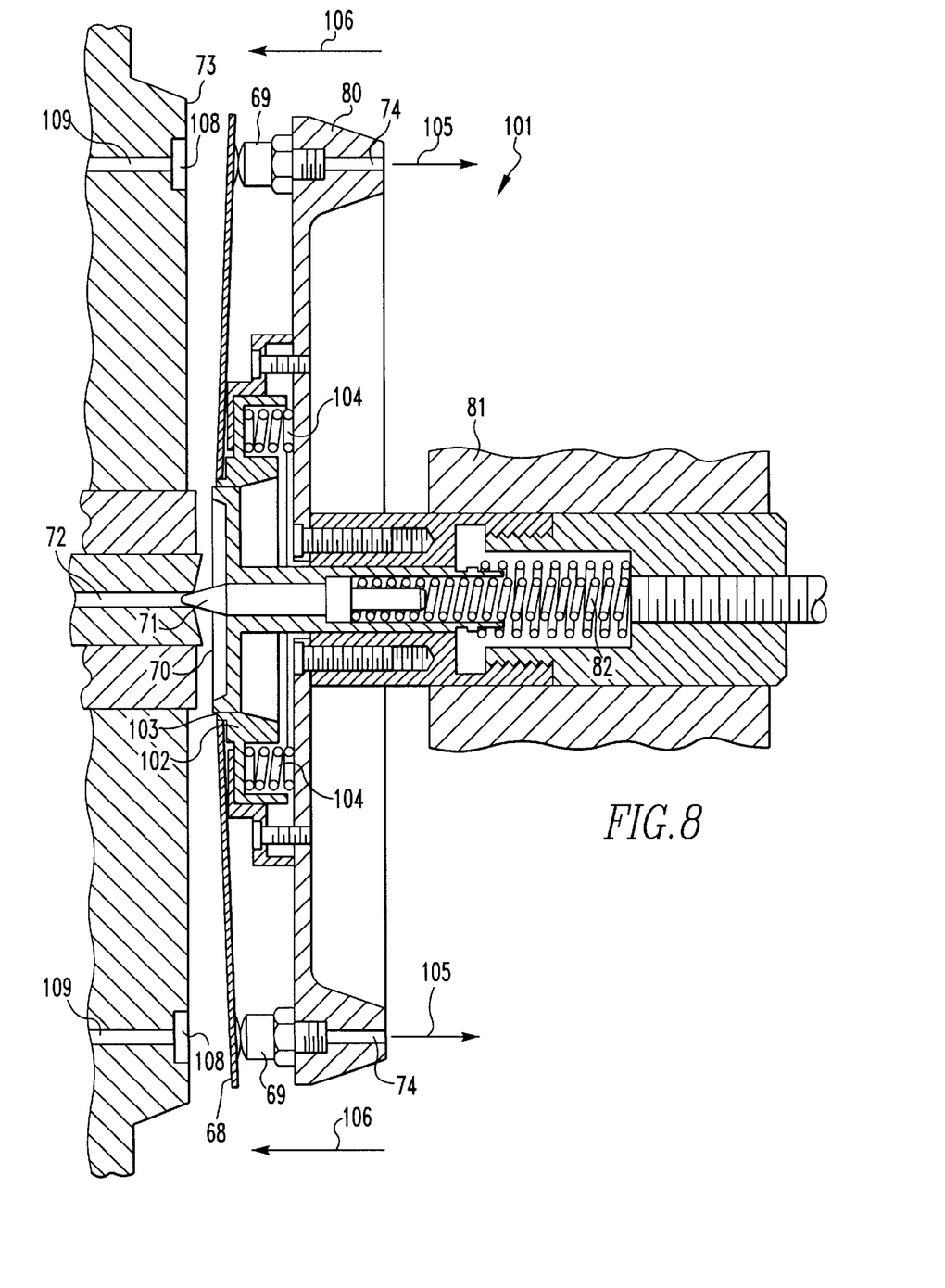
FIG. 8 shows a view corresponding with FIG. 7 of an embodiment of a head according to the invention in the situation where the insert plate has yet to be placed.
Figure 9:
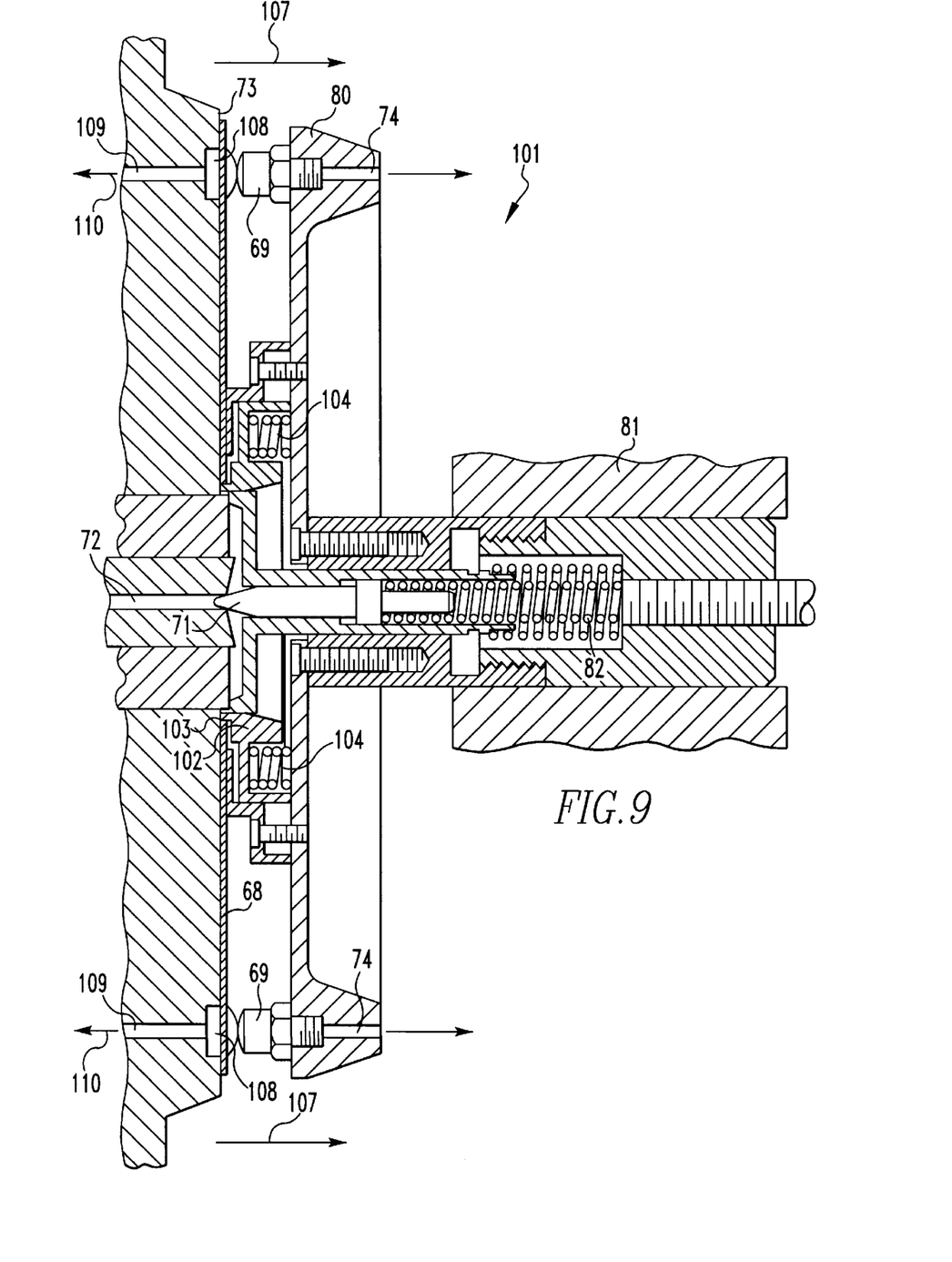
FIG. 9 shows a view corresponding with FIG. 8 of the situation where the insert plate is placed and the head is ready for retraction.

The structure according to FIGS. 8 and 9 differs at several minor points from the structure shown in FIG. 7. However, this of no importance for the understanding of the invention.

Of essential importance for the invention is the presence in head 101 of a central plastic ring 102 which with an annular central region 103 is in pushing co-action with the edge zone of central hole 70 of insert plate 68. Because plastic ring 102 is spring-loaded relative to carrier plate 80 by a ring of helical pressure springs 104, the insert plate 68 can be pressed in the manner shown in FIG. 8 by ring 102 in the direction of mould wall 73, while the ring of active suction cups 69 hold the peripheral zone of insert plate 68. The drawn convex form directed to mould wall 73 hereby results. The operation of suction cups 69 is indicated symbolically by arrows 105 which indicate the action of a suction pump (not drawn) via connections 74.

Arrows 106 indicate the movement of head 101 with insert plate 68 in the direction of mould wall 73.

With reference to FIG. 7 the operation of the blunt, tapering centering pin 71 has already been described which can co-act with the central hole 72 in the middle of mould wall 73. After the correct centering has been realized with the shown convex form of insert plate 68, a further displacement of head 101, and therewith of carrier plate 80, takes place as according to arrows 106, whereby from the middle zone of carrier plate 80 a gradual further pushing of insert plate 68 takes place to the zones located further to the outside with increasing compression of pressure springs 104. Once complete and flat pressing of insert plate 68 against mould wall 73 has been achieved, the energizing of suction cups 69 is ended, this being indicated in FIG. 9 by arrows 105 not being drawn therein. In this situation is then ensured that head 101 and carrier plate 80 can be retracted as according to arrows 107. Prior thereto it must however be ensured that insert plate 68 remains fixed relative to the flat mould wall 73. A groove 108 with the general shape of a ring or an annular structure of holes or other zones permeable to medium is present for this purpose in mould wall 73. This permeable zone or zones are connected to suction lines 109 which are connected to a suction pump (not drawn). In the situation of FIG. 8 the relevant suction pump is non-operational, while in the situation of FIG. 9 the pump in question is operational, this being designated symbolically with arrows 110. Via the permeable zones 108 a suction force is exerted on insert plate 68 by the associated suction action, whereby it remains very firmly pressed against wall 73. As soon as this pressing-on is ensured by energizing said suction pump, the head 101 can be retracted as according to arrows 107, the mould can be closed in the manner stated in the foregoing and a begin can be made with manufacturing an information carrier by injection moulding.

Attention is drawn to the fact that the provisions for holding insert plate 68 against mould wall 73 can also comprise for instance suction zones or other radial positions.

Alternatively, an insert plate of ferromagnetic type can also be held in place by electromagnetic means.

The structure according to the invention as shown in FIGS. 8 and 9 ensures that when an insert plate is placed against the mould wall the centering can take place reliably in very simple manner without great frictional forces being necessary in achieving a correct centering. In addition, the head 101 is embodied such that if desired a relatively large press-on force can be exerted on an insert plate 68 both in the centre and in the peripheral zone. An insert plate which is not wholly flat can hereby also be pressed very flat against mould wall 73.

What is claimed is:

1. An auxiliary device to be added to an injection moulding device for manufacturing disc-like information carriers, which injection moulding device comprises:

a mould having at least two mould parts displaceable relative to each other, which mould parts in a first relative position bound a mould cavity, the form of which corresponds with the form of the information carriers for manufacture, into which mould cavity debouches a feed for heated plastic, and which mould parts in a second relative position are located at a distance from each other such that the mould cavity is accessible; and first holding means for holding in a desired position an insert plate for placing against an end wall of the mould cavity, on which plate is located the information to be recorded onto the information carrier, such that the insert plate remains in position relative to the mould cavity when a formed information carrier is removed;

which auxiliary device comprises:

a supply holder configured to receive at least one insert plate;

transporting means for transporting successive insert plates between the supply holder and the mould, which transporting means comprise a head which is adapted to displace successive insert plates in axial direction to and from said end wall, all of which plates are provided with a central continuous hole, and which head comprises centering means for placing an insert plate in correct position relative to the end wall by making use of a continuous central hole in an insert plate;

which head comprises:

second holding means for engaging an insert plate in an edge zone;

resiliently compressible pushing means for pushing on a central zone of the insert plate counter to the action of the second holding means, such that the insert plate acquires a convex form and the insert plate can contact the end wall first with said central zone; and control means connected or connectable to the injection moulding device which are adapted to:

control the transporting means;

release the transporting means only in the second relative position of the mould parts in order to transport an insert plate from or to the mould, and control the first holding means and the second holding means such that said central zone of an insert plate first contacts the end wall, through continuing axial displacement the whole insert plate is eventually pressed against the end wall, the first holding means subsequently exert a force on the insert plate such that on backward axial displacement of the head the insert plate is held against the end wall by the first holding means.

2. The auxiliary device as claimed in claim 1, wherein the centering means comprise a pin.

3. The auxiliary device as claimed in claim 2, wherein the pin tapers toward an outside thereof.

4. The auxiliary device as claimed in claim 2, wherein the pin has a blunt end.

5. The auxiliary device as claimed in claim 1, wherein the holding means are magnetic.

6. The auxiliary device as claimed in claim 1, wherein the holding means include a suction device.

7. The auxiliary device as claimed in claim 1, wherein the pushing means comprise a spring-loaded ring.

8. The auxiliary device as claimed in claim 7, wherein the ring is tiltable.

9. The auxiliary device as claimed in claim 7, wherein the ring is plastic.

10. The auxiliary device as claimed in claim 7, wherein the ring engages only in a zone adjoining the continuous central hole in the insert plate.

11. The auxiliary device as claimed in claim 10, wherein the radial extent of said engagement zone amounts to a maximum of 3 mm.

* * * * *